United States Patent [19]

Kouda et al.

[11] Patent Number: 4,826,205
[45] Date of Patent: May 2, 1989

[54] ANTI-SQUAT CONTROL SYSTEM FOR AUTOMOTIVE SUSPENSION SYSTEM

[75] Inventors: Masanori Kouda; Tomoyoshi Sekiguchi; Yukio Ikeda; Minoru Taniguchi; Yasuhiro Shiraishi; Junkichi Konishi, all of Kanagawa, Japan

[73] Assignees: Atsugi Motor Parts Company, Limited, Atsugi; Nissan Motor Company, Limited, Yokohama, both of Japan

[21] Appl. No.: 203,841

[22] Filed: Jun. 8, 1988

[30] Foreign Application Priority Data

Jun. 12, 1987 [JP] Japan .............................. 62-90342[U]

[51] Int. Cl.⁴ .......................... F16F 9/44; B60G 9/00; B60G 17/06
[52] U.S. Cl. .................................... 280/703; 188/299; 280/707
[58] Field of Search ...................... 280/702, 703, 711; 188/299

[56] References Cited

U.S. PATENT DOCUMENTS

| | | | |
|---|---|---|---|
| 4,526,401 | 7/1985 | Kakizaki et al. | 280/707 |
| 4,729,459 | 3/1988 | Inagaki et al. | 280/703 |
| 4,741,554 | 5/1988 | Okamoto | 280/703 |
| 4,743,000 | 5/1988 | Karnopp | 280/707 |
| 4,746,106 | 5/1988 | Fukumura | 280/707 |
| 4,747,615 | 5/1988 | Yamamoto | 280/707 |
| 4,756,549 | 7/1988 | Kurosawa et al. | 280/707 |
| 4,761,022 | 8/1988 | Ohashi et al. | 280/703 |

Primary Examiner—Richard A. Bertsch
Attorney, Agent, or Firm—Foley & Lardner, Schwartz, Jeffery, Schwaab, Mack, Blumenthal & Evans

[57] ABSTRACT

An anti-squat suspension control system includes an anti-squat control disabling means for disabling anti-squat control for a period while an engine idling condition detector switch is held closed or a given period after the engine idling condition detector switch is switched from closed position to open position. The system also includes fail detector means for monitoring operation of the engine idling condition detector switch to detect failure of the switch. When the failure of the engine idling condition detector switch is detected, the anti-squat disabling means is disabled.

17 Claims, 9 Drawing Sheets

ANTI-SQUAT CONTROL SYSTEM FOR AUTOMOTIVE SUSPENSION SYSTEM

BACKGROUND OF THE INVENTION

1. Field of the Invention

The present invention relates generally to a suspension control system for an automotive vehicle, for regulating vehicular attitude. More specifically, the invention relates to an anti-squat suspension control system which can suppress squat or nose-up upon vehicular accleration. Particularly, the invention relates to anti-squat suspension control system which is active for suppressing squat when vehicle starts to run and/or demand for vehicular acceleration in a greater magnitude occurs.

2. Description of the Background Art

Japanese Patent First (unexamined) Publication (Tokkai) Showa No. 58-116215 discloses an anti-squat suspension control system. The disclosed system has a control unit connected to a throttle angle sensor, a vehicle stopping condition detector or brake switch and a vehicle speed sensor to receive therefrom a throttle angle indicative signal, a vehicle stopping indicative signal and a vehicle speed indicative signal. The control unit also connected to an engine idling condition detector switch to receive engine idling condition indicative signal therefrom. The control unit derives vehicular acceleration and compares the vehicular acceleration with a reference value. Also, the control unit detects the vehicle driving condition based on the input parameters. The control unit is active to harden suspension when the following condition is satisfied:

the engine idling condition detector switch is open which is representative of depressed condition of an accelerator pedal;

the brake switch is held open which represents released condition of the brake; and magnitude of the vehicle acceleration is greater than a predetermined value.

By hardening the suspension system, squat or nose-up which can occur when the vehicle start running or the vehicle accelerates in a magnitude in excess of a given magnitude, is successfully suppressed. In the suspension control system disclosed in the aforementioned Japanese Patent First Publication, the control unit utilizes the engine idling condition detector switch for providing a predetermined delay time for hardening or stiffen the suspension characteristics after the engine idling condition detector switch is opened in view of mechanical lag time in power train. Particularly, the lag time is set about 80 msec.

In such conventional suspension control system, the open condition of the engine idling condition detector switch is used as essential parameter for stiffen or harden the suspension characteristics. Therefore, when the engine idling condition detector switch fails or is damaged, suspension control system becomes impossible.

SUMMARY OF THE INVENTION

Therefore, it is an object of the present invention to provide an anti-squat suspension control system which can continue accurate or precise suspension control even when the engine idling condition detector switch fails.

Another object of the invention is to provide an anti-squat suspension control system which can detect failure of the engine idling condition detector switch and perform fail-safe operation.

In order to accomplish the aforementioned and other objects, an anti-squat suspension control system, according to the present invention, includes an anti-squat control disabling means for disabling anti-squat control for a period while an engine idling condition detector switch is held closed or a given period after the engine idling condition detector switch is switched from closed position to open position. The system also includes fail detector means for monitoring operation of the engine idling condition detector switch to detect failure of the switch. When the failure of the engine idling condition detector switch is detected, the anti-squat disabling means is disabled.

According to one aspect of the invention, a suspension control system for an automotive vehicle comprises a suspension assembly disposed between a vehicle body and a suspension member rotatably supporting a road wheel, the suspension assembly including a shock absorber variable of damping characteristics at least between a first harder damping mode and a second softer damping mode in which is produced a damping force smaller than that produced in the first harder damping mode, a pneumatic spring variable of spring characteristics at least between a first stiffer spring mode and a second softer spring mode in which the pneumatic spring is softer than that in the first stiffer spring mode, a sensor means monitoring preselected suspension control parameters affecting vehicular attitude, the sensor means including a sensor for monitoring magnitude of vehicular acceleration representing parameter, and a control unit receiving inputs representative of the suspension control parameter including vehicular acceleration representing parameter from the sensor means to derive a damping control signal for operating the shock absorber to one of the first harder damper mode and the second softer damper mode, and a spring control signal for operating the pneumatic spring to one of the first stiffer spring mode and the second softer spring mode, the control unit normally operating the shock absorber to the second softer damping mode and the pneumatic spring to the second softer spring mode, the control unit being responsive to the acceleration magnitude greater than a first acceleration threshold to operate the shock absorber to the first harder damper mode, and the control unit being responsive to acceleration magnitude greater than a second acceleration threshold to operate the pneumatic spring to the first stiffer spring mode.

According to another aspect of the invention, an anti-squat suspension control system for an automotive vehicle comprises a front suspension assembly disposed between a vehicle body and a suspension member rotatably supporting a front road wheel, the front suspension assembly including a first shock absorber variable of damping characteristics at least between a first harder damping mode and a second softer damping mode in which is produced a damping force smaller than that produced in the first harder damping mode, a first pneumatic spring variable of spring characteristics at least between a first stiffer spring mode and a second softer spring mode in which the pneumatic spring is softer than that in the first stiffer spring mode, a rear suspension assembly disposed between a vehicle body and a suspension member rotatably supporting a rear road wheel, the rear suspension assembly including a second shock absorber variable of damping characteristics at least between a first harder damping mode and a second softer damping mode in which is produced a damping force smaller than that produced in the first harder damping mode, a second pneumatic spring variable of spring characteristics at least between a first stiffer spring mode and a second softer spring mode in which the pneumatic spring is softer than that in the first stiffer spring mode, a sensor means monitoring preselected suspension control parameters affecting vehicular attitude, the sensor means including a sensor for monitoring magnitude of vehicular acceleration representing parameter, and a control unit receiving inputs representative of the suspension control parameter including vehicular acceleration representing parameter from the sensor means to detect the vehicle driving condition causing squat and derive a squat magnitude representing value, the control unit deriving a damping control signal for operating the shock absorber to one of the first harder damper mode and the second softer damper mode, and a spring control signal for operating the pneumatic spring to one of the first stiffer spring mode and the second softer spring mode, on the basis of the suspension control parameters, the control unit normally operating the shock absorber to the second softer damping mode and the pneumatic spring to the second softer spring mode, the control unit being responsive to the squat magnitude representing value greater than a first threshold to operate the second shock absorber in the rear suspension assembly to the first harder damper mode, and the control unit being responsive to the squat magnitude representing value greater than a second threshold to operate the second pneumatic spring in the rear suspension assembly to the first stiffer spring mode.

According to a further aspect of the invention, an anti-squat suspension control system for an automotive vehicle comprises a front suspension assembly disposed between a vehicle body and a suspension member rotatably supporting a front road wheel, the front suspension assembly including a first shock absorber variable of damping characteristics at least between a first harder damping mode and a second softer damping mode in which is produced a damping force smaller than that produced in the first harder damping mode, a first pneumatic spring variable of spring characteristics at least between a first stiffer spring mode and a second softer spring mode in which the pneumatic spring is softer than that in the first stiffer spring mode, a rear suspension assembly disposed between a vehicle body and a suspension member rotatably supporting a rear road wheel, the rear suspension assembly including a second shock absorber variable of damping characteristics at least between a first harder damping mode and a second softer damping mode in which is produced a damping force smaller than that produced in the first harder damping mode, a second pneumatic spring variable of spring characteristics at least between a first stiffer spring mode and a second softer spring mode in which the pneumatic spring is softer than that in the first stiffer spring mode, a sensor means monitoring preselected suspension control parameters affecting vehicular attitude, the sensor means including a sensor for monitoring magnitude of vehicular acceleration representing parameter, the sensor means detecting an engine idle switch position switching from ON to OFF and engine speed representing parameter, and a control unit receiving inputs representative of the suspension control parameter including vehicular acceleration representing parameter from the sensor means to detect the vehicle driving condition causing squat and derive a squat magnitude representing value, the control unit deriving a damping control signal for operating the shock absorbing to one of the first harder damper mode and the second softer damper mode, and a spring control signal for operating the pneumatic spring to one of the first stiffer spring mode and the second softer spring mode, on the basis of the suspension control parameters, the control unit normally operating the shock absorber to the second softer damping mode and the pneumatic spring to the second softer spring mode, the control unit being responsive to the squat magnitude representing value greater than a first threshold to operate the second shock absorber in the rear suspension assembly to the first harder damper mode, the control unit being responsive to the squat magnitude representing value greater than a second threshold to operate the second pneumatic spring in the rear suspension assembly to the first stiffer spring mode, the control unit being responsive to ON state of the idle switch and switching of the idle switch from ON to OFF for providing a given delay time to initiate the anti-squat control after the timing of switching of the idle switch, and the controller detecting faulty condition of the idle switch in view of an engine speed data derived from the engine speed representing parameter to disable providing of the given delay time in anti-squat control.

The control unit preferably detects ON position of the idle switch representing the engine idling state and compares the engine speed data with an engine speed reference value representative of a possible maximum engine idling speed, to detect faulty condition of the idle switch when the engine speed data is greater than the engine speed reference value. The control unit disables providing of the given delay time when the idle switch is held ON and the engine speed data is held greater than the engine speed reference over a given period of time.

According to a yet further aspect of the invention, an anti-squat suspension control system for an automotive vehicle comprises a front suspension assembly disposed between a vehicle body and a suspension member rotatably supporting a front road wheel, the front suspension assembly being variable of suspension characteristics at least between a first harder mode and a second softer mode, a rear suspension assembly disposed between a vehicle body and a suspension member rotatably supporting a rear road wheel, the rear suspension assembly being variable of suspension characteristics at least between a first harder mode and a second softer mode, a sensor means monitoring preselected suspension control parameters affecting vehicular attitude, the sensor means including a sensor for monitoring magnitude of vehicular acceleration representing parameter, the sensor means detecting an engine idle switch position switching from ON to OFF and engine speed representing parameter, and a control unit receiving inputs representative of the suspension control parameter including vehicular acceleration representing parameter from the sensor means to detect the vehicle driving condition causing squat and derive a squat magnitude representing value, the control unit deriving a damping control signal for operating the front and rear suspension members to one of the first harder mode and the secnd softer mode, the control unit normally operating the front and rear suspension systems to first softer mode, the control unit being responsive to the squat magnitude representing value greater than a predetermined threshold to operate the rear suspension system to the first harder mode and to maintain the front suspension system at the second softer mode, the control unit being responsive to ON state of the idle switch and switching of the idle switch from ON to OFF for providing a given delay time to initiate the anti-squat control after the timing of switching of the idle switch, and the controller detecting faulty condition of the idle switch in view of an engine speed data derived from the engine speed representing parameter to disable providing of the given delay time in anti-squat control.

DESCRIPTION OF THE PREFERRED EMBODIMENT

Figure 1:
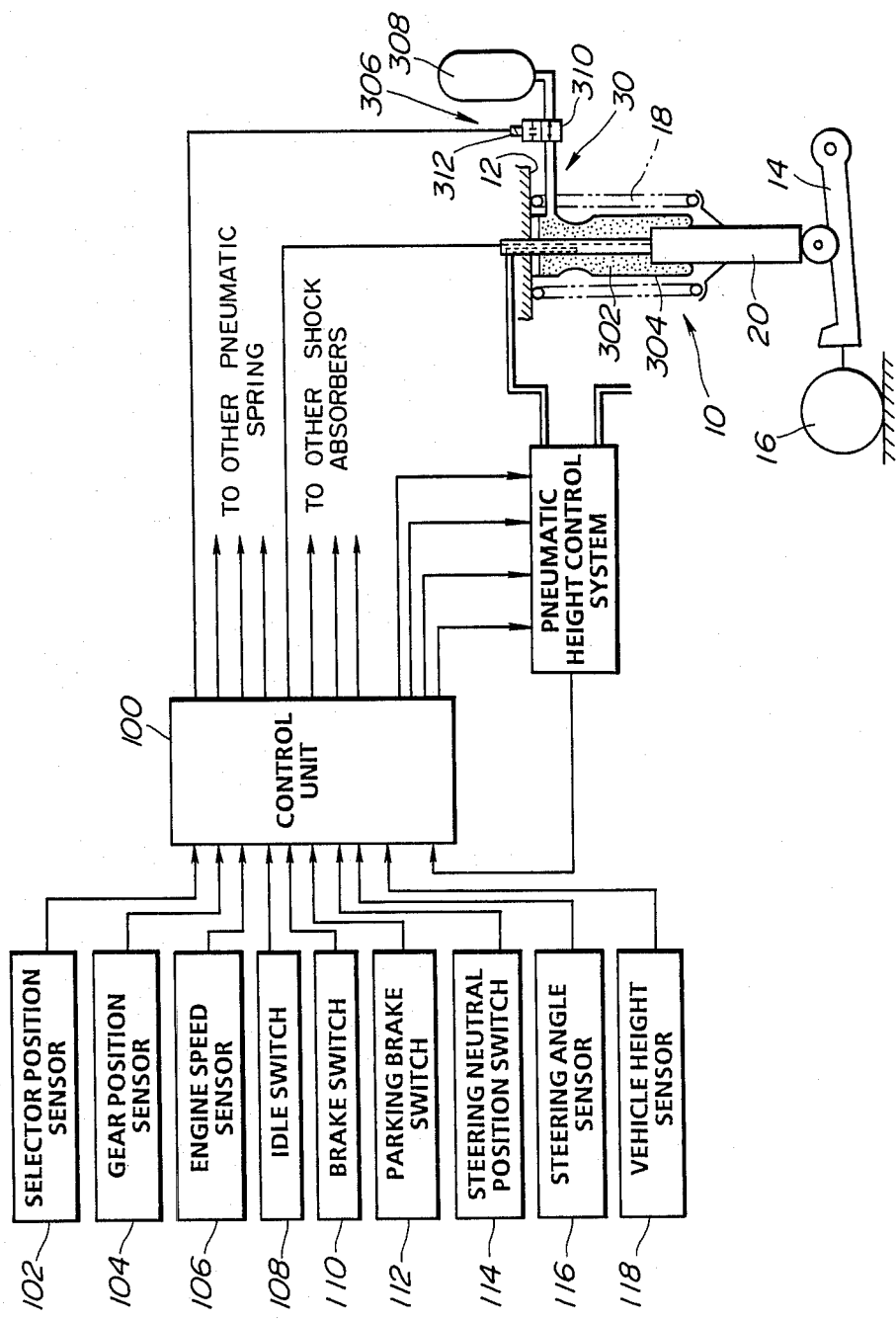
FIG. 1 is a block diagram of the preferred embodiment of an anti-squat suspension control system, according to the present invention.

Referring now to the drawings, particularly to FIG. 1, the preferred embodiment of a suspension control system, according to the present invention, employs a suspension assembly 10 disposed between a vehicle body 12 and a suspension member 14, such as a suspension arm, a suspension link or so forth, rotatably supporting a road wheel 16. The suspension assembly 10 comprises a shock absorber 20 variable of damping characteristics and a pneumatic spring assembly 30 variable of spring characteristics. The suspension assembly 10 also includes a suspension coil spring 18.

In order to adjust the damping characteristics of the shock absorber 20 and the spring characteristics of the pneumatic spring assembly 30, a control unit 100 is provided. The control unit 100 is connected to a various sensors including a transmission selector position sensor 102 which may comprise an inhibiter switch, a transmission gear position sensor 104, an engine speed sensor 106, an idling switch 108, a brake switch 110, a parking brake switch 112, a steering neutral position switch 114, a steering angle sensor 116 and a vehicle height sensor 118.

The transmission selector position sensor 102 monitors an automotive transmission selector position to produce HIGH level selector position indicative signal SS when the transmission selector is shifted at park range position or neutral range position. The transmission gear position sensor 104 monitors a transmission gear position and produces a transmission gear position indicative signal SG having a value variable depending upon selected the transmission gear position. The engine speed sensor 106 monitors engine revolution speed to produce an engine speed indicative signal SN representative of the monitored engine speed. In the shown embodiment, the engine speed sensor comprises an optical sensor monitoring rotation speed of an engine output shaft for deriving the engine speed data based thereon. On the other hand. As is well known, a crank angle sensor of per se well known construction and designed to monitor angular position of an engine crank shaft can be utilized for monitoring the engine speed in place of the engine speed sensor set forth above. In the latter case, the engine speed is derived on the basis of frequency of crank position signal or crank reference signal. The idling switch 108 is associated with a throttle value (not shown) disposed within an induction system of an automotive engine for detecting fully closed or essentially fully closed position of the throttle valve to produce a HIGH level engine idling condition indicative signal SI. The brake switch 110 is associated with a brake pedal (not shown) to detect depressed condition of the brake pedal to produce a braking state indicative signal SB. The parking brake switch 112 is designed to detect a vehicular parking brake (not shown) to produce a parking condition indicative signal SP. The steering neutral position switch 114 is associated with a steering wheel (not shown) or steering column shaft to detect neutral position of the steering to produce a steering neutral position indicative signal $S\theta_O$ when neutral position of the steering is detected. The steering angle sensor 116 is designed to monitor angular displacement of steering wheel or steering column to produce a steering angle indicative signal $S\theta$. In the preferred embodiment, the steering neutral position switch 114 and the steering angle switch 116 are coupled to each other as a combined sensor assembly 40 detailed construction of which will be discussed later. The vehicle height sensor 118 may comprise various sensors, such as an ultra sonic sensor, mechanical stroke sensor disposed between the vehicle body and the suspension member for monitoring relative motion stroke therebetween, an accelerometer monitoring vertical acceleration, or so forth. The vehicle height sensor 118 generally monitors a height level of the vehicle body 12 relative to the suspension member 14 and whereby monitors height level of the vehicle body relative to the road surface to produce a vehicle height indicative signal Sh.

The vehicle height indicative signal of the vehicle height sensor 118 is used not only for anti-squat suspension control but also for anti-rolling, anti-pitching, anti-bouncing suspension control. The vehicle height data of the vehicle height sensor 118 is also utilized for regulating a vehicle height.

Figure 2:
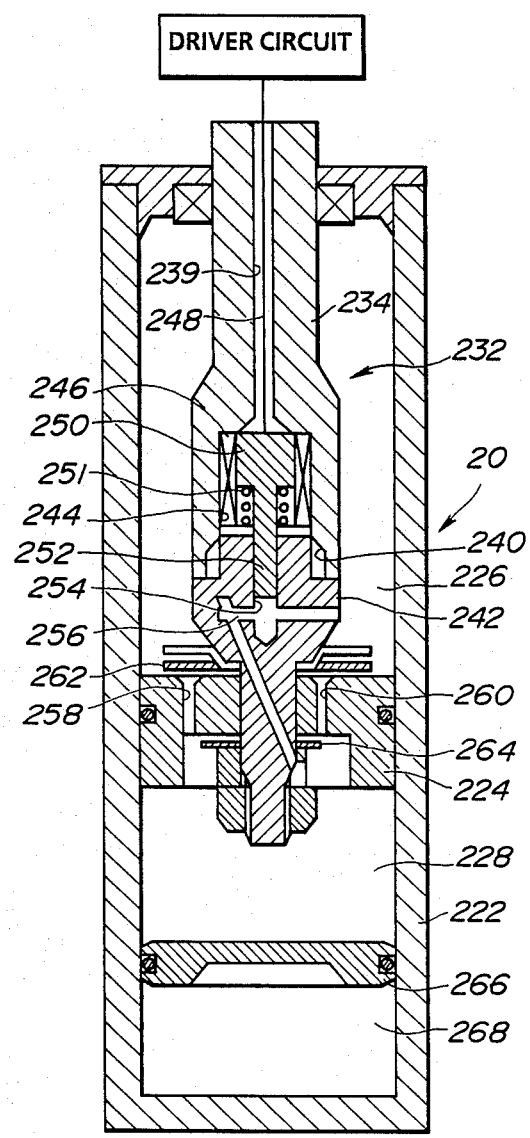
FIG. 2 is a sectional view of the preferred construction of a damping-force variable shock absorber which is employed in the preferred embodiment of the anti-squat suspension system of FIG. 1.

FIG. 2 shows the preferred construction of the shock absorber 20 which can vary damping characteristic. As will be appreciated, the shown construction of the shock absorber 20 is variable of the damping characteristics between HARD suspension mode position and SOFT suspension mode position. Though the shown embodiment employs 2-way variable shock absorber, it may possible to employ 3-way variable shock absorber variable of the suspension mode between HARD suspension mode, MEDIUM suspension mode and SOFT suspension mode. Such 3-way variable shock absorber has been disclosed in the U.S. Pat. No. 4,526,401, for example. The disclosure of the aforementioned U.S. Patent is herein incorporated by reference for the sake of disclosure. Furthermore, any type of the shock absorbers which is variable of damping or suspension characteristics can be employed in the shown embodiment, as long as it can be electrically, electromechanically, hydraulically controlled in automatic fashion by the control signal from the control unit 50.

FIG. 2 shows the detailed structure of a variable-damping-force shock absorber 212 employed in the shown embodiment of the suspension control system according to the present invention. The shock absorber 212 generally comprises a hollow cylinder 220 and a piston 224 fitting flush within the hollow interior of the cylinder 220. The piston 224 defines upper and lower fluid chambers 226 and 228 within the cylinder 220. The cylinder 220 also receives a free piston 266 which defines a pneumatic chamber 268 below the lower fluid chamber 228.

The piston 224 is connected to the vehicle body (not shown) by means of a piston road which is generally referred to by the reference number 232. The piston rod 232 comprises upper and lower segments 234 and 236. The upper segment 234 is formed with an axially extending through opening 238. The lower end of the through opening 238 opens into a recess 240 defined on the lower end of the upper segment 234. On the other hand, the lower segment 236 has an upper section 242 engageable to the recess 40 to define therein a hollow space 44. An actuator is disposed within the space 244. The actuator 246 is connected to a driver circuit which will be discussed later, through a lead 248 extending through the through opening 238. The actuator 246 is associated with a movable valve body 250 which has a lower end extension 252 inserted into a guide opening 254 defined in the lower segment 236. The guide opening 254 extends across a fluid passage 256 defined through the lower segment 236 for fluid communication between the upper and lower fluid chambers 226 and 228.

The fluid passage 256 serves as a bypass for flow-restrictive flud passages 258 and 260 formed in the piston 224. The upper end of the fluid passages 258 is closed by a resilient flow-restricting valve 262. Similarly, the lower end of the fluid passage 260 is closed by a flow-restricting valve 264. The flow-restricting valves 262 and 264 serve as check valves for establishing one-way fluid communication in opposite directions. In addition, since the flow-restriction valves 262 and 264 are biased toward the ends of the fluids passages 258 and 260, they open to allow fluid communication between the upper and lower fluid chambers 226 and 228 only when the fluid pressure difference between the upper and lower chambers 226 and 228 overcomes the effective pressure of the valves.

The cross-sectional area of the fluid passages 258 and 260 and the set pressures of the fluid-restriction valves 260 and 262 determine the damping force produced in HIGH damping force mode. The cross-sectional area of the fluid passage 256 determines the drop in the damping force in the LOW damping force mode in comparison with that in the HIGH damping force mode.

The movable valve body 250 is normally biased upwards by means of a coil spring 251. As a result, when the actuator 246 is not energized, the lower end section 252 of the valve body 250 is separated from the fluid passage 256 to allow fluid communication between the upper and lower chamber. When the actuator 246 is energized. The valve body 250 moves downwards against the resilient force of the coil spring 251 to block the fluid passage 256 with the lower end extension 252. As a result, fluid communication between the upper and lower fluid chambers 226 and 228 via the fluid passage 256 is blocked. When fluid communication through the fluid passage is permitted, the damping force produced by the shock absorber 20 remains LOW. On the other hand, when the fluid passage 256 is shut, fluid flow rate is reduced, thus increasing the damping force produced. Therefore, when the valve body 250 is shifted to the lowered position, he shock absorber works in HIGH damping force mode to produce a higher damping force against vertical shocks.

In the normal state wherein the control signal of the control unit 100 remains LOW, the movable valve body 250 is held in its upper position by the effect of the spring force 251 so that the lower end extension 252 does not project into the fluid passage 256. Therefore, the fluid communication is established through both the fluid passage 256 and the applicable one of the flow-restricting fluid passages 258 and 260. As a result, the total flow restriction is relatively weak to allow the shock absorber to operate in SOFT mode.

In response to a HIGH-level control signal from the control unit 100, the shock absorber 20 is operated to energize the actuator 246. The actuator 246 drives the movable valve body 250 downward. This downward movement shifts the lower end of the extension 252 of the valve body 250 into the fluid passage 256 so as to block fluid communication between the upper and lower fluid chambers 226 and 228 via the fluid passage 256. Therefore, the fluid can flow between the upper and lower chambers 226 and 228 only through one of the fluid passages 258 and 260. The fluid flow restriction is, thus, increased, resulting in a greater damping force than is produced in the SOFT mode. In other words, the shock absorber 20 operates in HARD mode.

As seen from FIG. 1, the pneumatic spring assembly 30 comprises a pneumatic chamber 302 defined above the shock absorber 20 by means of an elastically deformable rolling diaphragm 304. The pneumatic chamber 302 is connected to a pneumatic pressure system which is generally represented by the reference numeral "306". The pneumatic pressure system 36 includes a pneumatic pressure accumulator 308. The pneumatic pressure accumulator 308 is connected to the pneumatic chamber 302 via a pressure control valve 310. The pressure control valve 310 includes an electromagnetically operable actuator 312 which is connected to the control unit 100 to be operated by a pneumatic pressure control signal from the latter to be operated between an open position for establishing communication between the pneumatic pressure accumulator 308 and the pneumatic chamber 302, and a close position for blocking communication therebetween.

In the shown construction, the pneumatic pressure accumulator 308 serves as additional volume of the pneumatic chamber 302 for adjustment of the spring characteristics of the pneumatic spring assembly 30. Namely, when the pneumatic chamber 302 is shut from the pneumatic pressure accumulator 308, the spring characteristics of the pneumatic spring assembly 30 becomes relatively rigid. On the other hand, when communication between the pneumatic chamber 302 and the pressure accumulator 308 is established, volume of the pneumatic chamber is increased to make the spring characteristics of the pneumatic spring assembly 30 relatively flexible.

In addition, the pneumatic chamber 302 is connected to a pneumatic height control system 310. Pneumatic circuit construction of the pneumatic height control system is per se well known and need no detailed disclosure. The height control system supplied pressurized air to the pneumatic chamber for adjusting the pneumatic pressure in the pneumatic chamber for adjusting the relative distance between the vehicle body and the suspension member. As is well known, the height control system is generally designed for adjusting the vehicular height at desired height position and/or regulating the vehicular height irrespective of the load condition on the vehicle.

Figure 4:
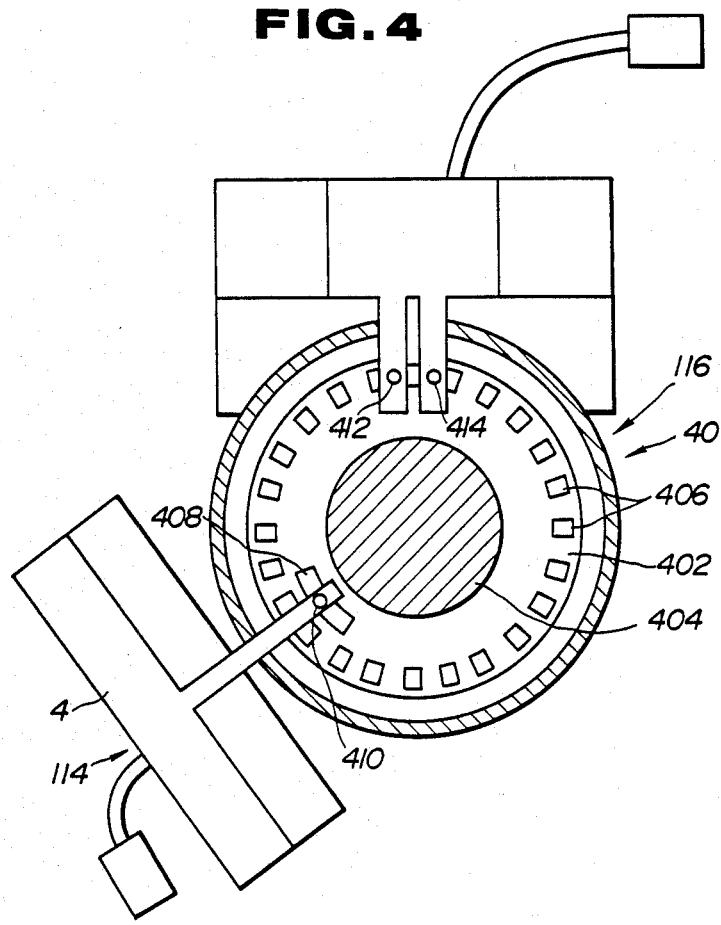
FIG. 4 is a fragmentary and explanatory illustration of a steering sensor employed in the preferred embodiment of the suspension control system of FIGS. 1 and 3.

As shown in FIG. 4, the steering sensor assembly 40 comprises a rotary disc 402 rigidly fixed to a steering column shaft 404 for rotation therewith. The rotary disc 402 is formed with a plurality of circumferentially arranged slits 406. These slits 406 are oriented in circumferential spaced apart relationship to each other with a given regular intervals. The rotary disc 402 is also formed with an arc-shaped and circumferentially elongated slit 408. Optical sensors such as photo-interrupter, which serves as the steering neutral position switch 114 and the steering angle sensor 116 are provided in opposition to the rotary disc 402. The steering neutral position switch 114 comprises a light emitting element 410 and a photo receiving element (not shown) to constitute the photo-interrupter. The light emitting element 410 is arranged so as to oppose to the arc-shaped slit 408 when the steering is held at neutral position. The as will be appreciated, the circumferential length of the arc-shaped slit 408 is determined in view of the play of the steering column shaft 404 in the neutral position. With this construction, the steering neutral position sensor 112 outputs the steering neutral position indicative signal $S\theta_O$ while the light emitting element 410 opposes the arc-shaped slit 408.

Figure 5:
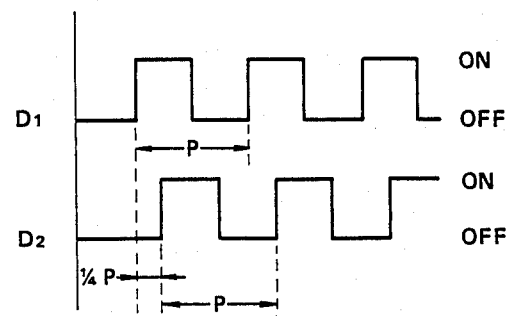
FIG. 5 is a timing chart of output pulses of the steering angle sensor of FIG. 4.

On the other hand, the steering angle sensor 114 comprises a pair of photosensors 412 and 414. Each of the photo sensors 412 and 414 comprises a photo emitting element and a photo receiving element arranged in alignment across the rotary disc 402. These photo sensors 412 and 414 are radially arranged to oppose the slits 406 to detect the slit positions. The photo sensors 412 and 414 are arranged in circumferentially spaned relationship. The distance between the photo sensors 412 and 414 corresponds one-fourth of pitch P of the adjacent slits 406 or multiple of the one-fourth of the pitch. This arrangement of the pair of the photo sensors 412 and 414 causes phase difference of pulse signals produced by the photo receiving elements thereof in response to the light emitted to the associated light emitting elements. The waveform of the pulses produced by the photo receiving elements of the photo sensors 412 and 414 are shown in FIG. 5. Assuming the span of the photo sensors 412 and 414 is one-fourth of the pitch P, the pulse signal $D_1$ produced by the photo sensor 412 and the pulse signal $D_2$ produced by the photo sensor 414 have phase shift of one-fourth of the pitch. In the shown layout of the photo sensors 412 and 414, the photo sensor 412 resides the leading side and the photo sensor 414 resides the following side when steering angular displacement occurs in left-hand steering direction. On the other hand, upon right-hand steering, the photo sensor 414 resides the leading side and the photo sensor 412 resides the following side. As will be appreciated, depending upon the steering direction, phase shift between the two pulse signals $D_1$ and $D_2$ varies. Namely, in left-hand steering, the leading edge of the pulse signal $D_1$ appears in advance of the leading edge of the pulse signal $D_2$, and in right-hand steering, the leading edge of the pulse signal $D_2$ appears in advance of the leading edge of the pulse signal $D_1$. Therefore, by monitoring the phase shift, steering direction can be detected.

On the other hand, since the slits 406 is arranged with a regular circumferential intervals, magnitude of angular displacemnt can be measured by counting number of pulse signals produced by one of the photo sensors 412 and 414.

Figure 3:
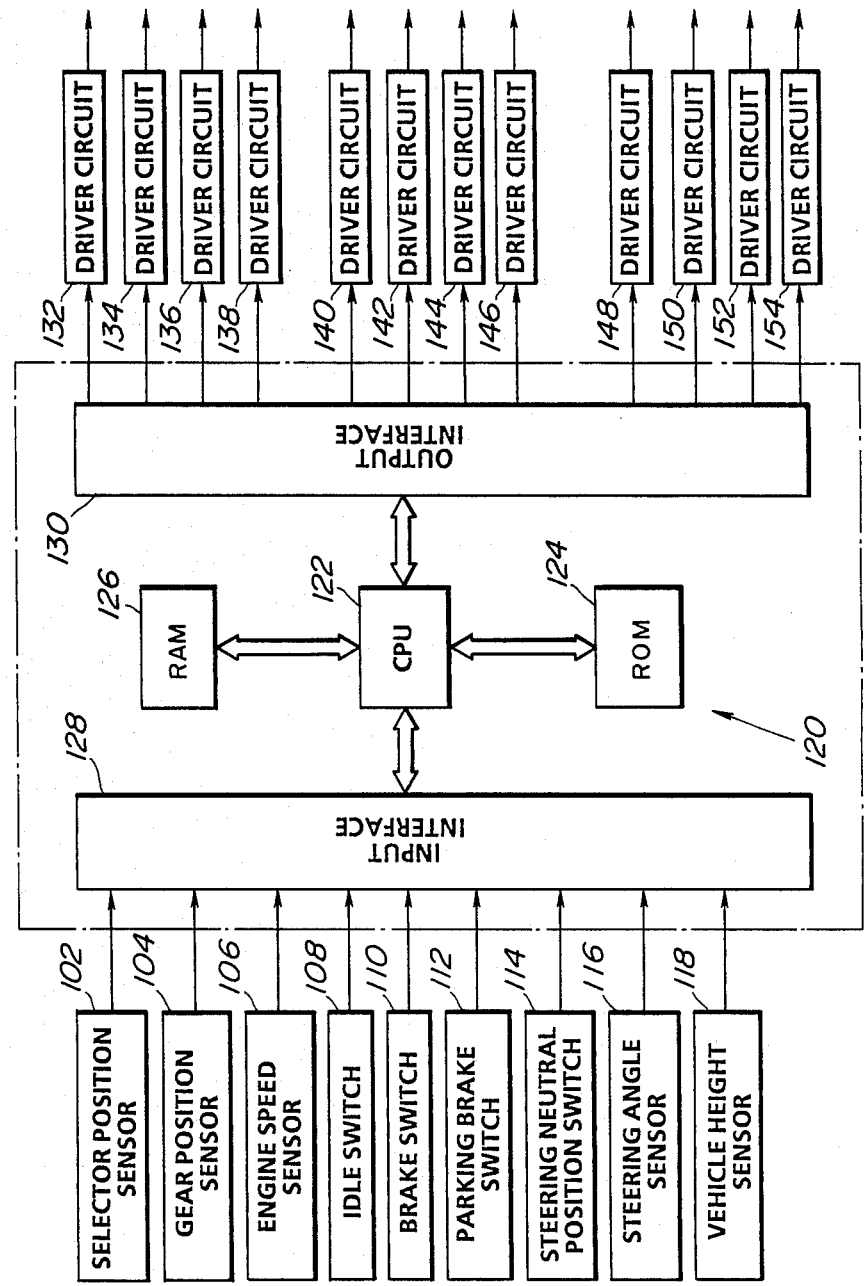
FIG. 3 is a block diagram of the preferred construction of a control unit employed in the anti-squat suspension control system of FIG. 1.

FIG. 3 shows circuitry of the preferred embodiment of the suspension control system, according to the invention. As seen from FIG. 3, the control unit 100 comprises a microprocessor 120 including CPU 122, ROM 124, RAM 126, an input interface 128 and an output interface 130. An analog-to-digital (A/D) converter 132 may be provided for converting the analog form vehicle height indicative signal Sh from the vehicle height sensor 118 into digital signal. The output interface 130 of the microprocessor 120 is connected to driver circuits 132, 134, 136 and 138 which are respectively connected to actuators 246 in the shock absorbers 20 disposed in respective front-left, front-right, rear-left and rear-right suspension systems. Damping characteristics control signals are fed to the driver circuits 132, 134, 136 and 138 for operating the damping mode of the shock absorbers 20 between HARD mode position, in which relatively greater damping force is created in response to relative displacement between the vehicle body and the suspension member, and SOFT mode position in which relatively smaller damping force is created.

Similarly, the output interface 130 is connected to driver circuits 140, 142, 144 and 146 which are connected to the actuators 312 of the pressure control valves 310 provided in respective front-left, front-right, rear-left and rear-right suspension systems. Pneumatic spring characteristics control signals are fed through the output interface 130 to the driver circuit 140, 142, 144 and 146 to operate the pressure control valve 310 between open position, at which the pneumatic spring assemblies operates in SOFT spring mode, and closed position, at which the pneumatic spring assemblies operates in HARD spring mode.

In addition, the output interface 130 is connected to driver circuits 148, 150, 152 and 154 which are connected to actuators in control valves in pneumatic circuit of the vehicular height adjusting system (not shown). Though FIG. 3 shows only four driver circuits 148, 150, 152 and 154 for the height control system, additional driver circuits may be provided for adjusting pneumatic pressure at a pressure source, such as compressor, a pressure accumulation control valve in the pneumatic circuit of the height control system, and so forth.

Pneumatic circuit construction and components constituting height control system as been disclosed in The disclosure of the aforementioned U.S. Patent is herein incorporated by reference for the sake of disclosure.

In the practical control, selection of HARD suspension mode and SOFT suspension mode of the shock absorber 20, and HARD spring mode and SOFT spring mode is performed on the basis of the suspension control parameters input from the sensors set forth above. The suspension control to be performed by the control unit 100 is not only anti-squat control, but also, anti-rolling control, anti-pitching control, anti-bouncing control and so forth. However, for simplification of the disclosure in order to facilitate better understanding the invention, the following discussion will be concentrated only to anti-squat control to be performed by the control unit 100.

In the operation, the control unit 100 executes the routines illustrated in FIGS. 6 to 10 and a main program as a background job. In execution of the main program, height adjustment operation for regulating the vehicular height is performed. On the other hand, the routines of FIGS. 6 to 10 are programmed as interrupt routines to be executed interrupting the background job at every predetermined timing, e.g. every 20 msec.

Figure 6:
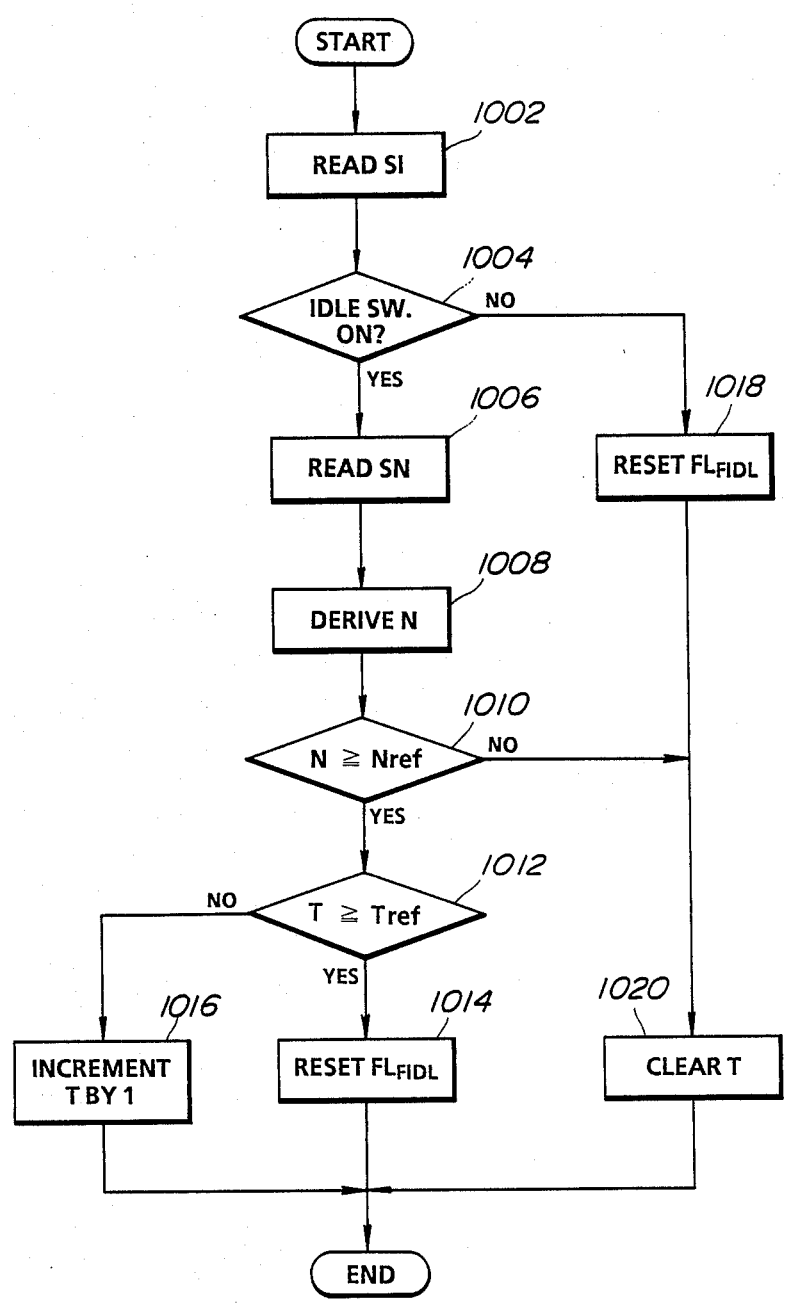
FIG. 6 is a flowchart of a routine for detecting failure of an idle switch.

FIG. 6 shows a routine for detecting failure of the idling switch 108. This routine is triggered every given timing while the transmission selector position indicative signal represents the parking range position or neutral range position of the the trasmission selector.

Immediately after starting execution, the level of the input signal SI from the idling switch 108 is read at a step 1002. Then, based on the read input signal level, check is performed whether the engine is in idling condition or not, at a step 1004. When the level of the signal SI as checked at the step 1004 is HIGH level to represent the engine idling condition, the engine speed N indicative signal SN is read at a step 1006. Based on the read engine speed indicative signal SN, the engine speed data N is derived at a step 1008. The derived engine speed data N is compared with a reference engine speed $N_{ref}$ at a step 1010. The reference engine speed $N_{ref}$ is set at a value greater than a possible maximum engine idline speed. For instance, since the engine idling speed is variable to be in a range of 500 to 700 r.p.m. at normal operation of the engine, about 1000 r.p.m. when an automotive air conditioner system is active in air conditioning mode, and about 1500 r.p.m. during engine warm-up, the reference engine speed is set at 2000 r.p.m. When the derived engine speed data N is greater than the reference engine speed $N_{ref}$, as checked at the step 1010, a timer value T is read from a timer which is triggered at first occurrence of the engine speed data N greater than the reference engine speed $N_{ref}$ while the HIGH level idling condition indicative signal SI is maintained, and checked with a given threshold $T_{ref}$, at a step 1012. When the read timer value T is greater than or equal to the given threshold $T_{ref}$, a faulty idling switch indicative flag $FL_{FIDL}$ is set at a step 1014. Thereafter, process goes END and return to the main routine.

On the other hand, when the timer value T is smaller than the threshold $T_{ref}$, the timer value is incremented by one (1), at a step 1016. After the step 1016, process goes END. When the idling switch position indicative signal SI as checked at the step 1004 is not HIG, the faulty idling switch indicative flag $FL_{FIDL}$ is reset at a step 1018. After the step 1018 or when the engine speed data N as checked at the step 1010 is smaller than the reference engine speed $N_{ref}$, the timer value T is cleared at a step 1020. Then, process goes END.

Figure 7:
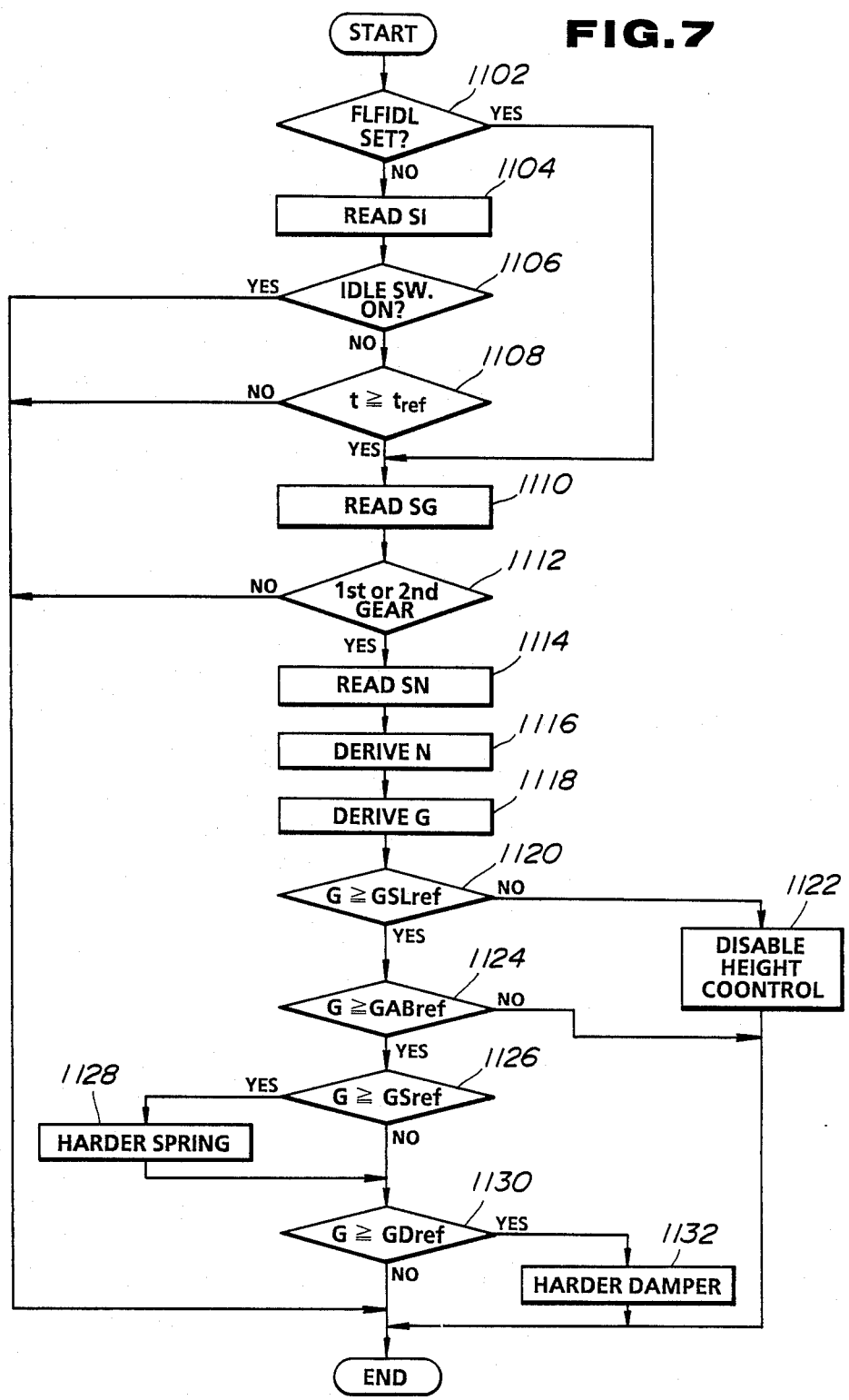
FIG. 7 is a flowchart of a routine for performing anti-squat suspension control.

FIG. 7 shows a routine for anti-squat control in response to starting up of running of the vehicle. Immediately after starting execution, the faulty idling switch indicative flag $FL_{FIDL}$ is checked at a step 1102. when the faulty idling switch indicative flag $FL_{FIDL}$ is not set as checked at the step 1102, the signal level of the idling condition indicative signal SI is read at a step 1104. The read idling condition indicative signal SI, check is performed whether the engine is in idling condition or not, at a step 1106. When the idling condition indicative signal SI, as checked at the step 1106 is HIGH, an elapsed time after turning the idling condition indicative signal SI from LOW to HIGH is checked whether the elapsed time T is longer than or equal to a predetermined period $t_{ref}$, e.g. 80 msec., at a step 1108.

The predetermined period $t_{ref}$ is determined in view of the mechanical lag time of power train in response to engine acceleration. Namely, when anti-squat suspension control is performed for switching mode of the suspension system from SOFT suspension mode to HARD suspension mode during the power train lag time, nose-dive tends to occur. Therefore, in order to avoid such vehicular attitude change, lag time in response to occurrence of the acceleration demand is preferably provided.

When the elapsed time t is longer than or equal to the predetermined period $t_{ref}$, the transmission gear position indicative signal SG is read at a step 1110. Then, the transmission gear position indicative signal SG is checked whether the transmission gear position is first gear position or second gear position, at a step 1112. When the transmission gear position as checked at the step 1112 is first or second gear position, the engine speed indicative signal SN is read at a step 1114. Based on the read engine speed indicative signal SN, the engine speed data N is derived, at a step 1116. At a step 1118, magnitude G of acceleration is derived on the basis of variation of the engine speed data N. In practice, the acceleration a magnitude G is derived by differentiating the engine speed data N.

At a step 1120, the acceleration G is compared with a slot start threshold $GSL_{ref}$ which represents vehicular acceleration criteria for distinguishing slow starting and normal or abrupt starting of the vehicle. When the acceleration G is smaller than or equal to the slow start threshold $GSL_{ref}$ as checked at the step 1120, process directly goes END.

On the other hand, when the acceleration G is greater than the slow start threshold $GSL_{ref}$ as checked at the step 120, vehicle height control is inhibited at a step 1122. In the practical operation, inhibiting of vehicular height control is performed is performed by outputting LOW level height control signals to the driver circuits 148, 150, 152 and 154 for blocking communication between the pneuamtic chambers 302 of respective pneumatic spring assemblies 30.

Preferably, height control inhibiting flag $FL_{HINHIB}$ is set when vehicle height control is inhibited. The system will be held at inhibited state for a given period of time which may correspond or slightly longer than a period of time required for stabilizing the vehicular attitude after starting up of running.

After the step 1122, the acceleration G is compared with a abrupt start threshold $GAB_{ref}$ which represents a vehicular acceleration criteria for discriminating abrupt and normal start up thereacross at a step 1124. When the acceleration is smaller than or equal to the abrupt acceleration threshold $GAB_{ref}$, process directly goes END.

On the other hand, when the acceleration as compared at the step 1124, the acceleration G is compared with a harder spring threshold $GS_{ref}$, in order to judge whether the vehicular accelerating condition requires HARD spring mode of the pneumatic spring assembly 30, at a step 1126. When the acceleration G is greater than or equal to the harder spring threshold $GS_{ref}$ as checked at the step 1126, the pneumatic spring control signal ordering the HARD spring mode is output to the driver circuits 144 and 146 to shut the pressure control valve 310 to block communication between the pneumatic chamber 302 and the pneumatic pressure accumulator 308, at a step 1128. At this time, the pneumatic spring control signal ordering HARD spring mode is not fed to the driver circuits 140 and 142. Therefore, the pressure control valves 310 connected to the driver circuits 140 and 142 are maintained at open position to keep the associated pneumatic spring assemblies 30 in SOFT spring mode. By this, the front-left and the front-right pneumatic spring assemblies 30 are held SOFT and the rear-left and the rear-right pneumatic spring assemblies 30 are switched to HARD.

It should be appreciated that the harder spring threshold $GS_{ref}$ and the harder damper threshold $GD_{ref}$ are independent of each other. In the preferred construction, the harder spring threshold $GS_{ref}$ and the harder damper threshold $GD_{ref}$ set at mutually different value so that the pneumatic spring assembly 30 and the shock absorber 20 are harden at mutually different timing according to the variation of the acceleration in a predetermined schedule.

After step 1128, the acceleration G is compared with a harder damper threshold $GD_{ref}$ in order to judge whether the vehicular accelerating condition requires HARD spring mode of the pneumatic spring assembly 30, at a step 1130. When the acceleration G is greater than or equal to the harder damper threshold $GD_{ref}$ as checked at the step 1130, the damper control signal ordering the HARD suspension mode is output to the driver circuits 136 and 138 to operate the shock absorbers 20 of the rear-left and rear-right suspension assemblies to HARD suspension mode, at a step 1132. At this time, the damper control signal ordering HARD suspension mode is not fed to the driver circuits 132 and 134. Therefore, the shock absorbers 20 of the front-left ad front-right suspension assemblies are held in SOFT suspension mode, at a step 1132.

When the faulty idling switch indicative flag $FL_{FIDL}$ is set as checked at the step 1102, process jumps from the step 1102 to the step 1110. As will be appreciated herefrom, when the failure of the idling switch is detected, the steps utilizing the idling condition indicative signal is skipped. Therefore, faulty idling switch will not affect the suspension control.

When the idling condition indicative signal SI is LOW level as checked at the step 1106, the elapsed time t as checked at the step 1108 is shorter than the predetermined period $t_{ref}$ or when the transmission gear position is other than first and second gear positions, process goes END.

On the other hand, when the acceleration G is smaller than the harder spring threshold $GS_{ref}$, process jumps the step 1128 and directly goes to the step 1132. Similarly, when the acceleration G is smaller than the harder damper threshold $GD_{ref}$, process jumps the step 1126.

Figure 8:
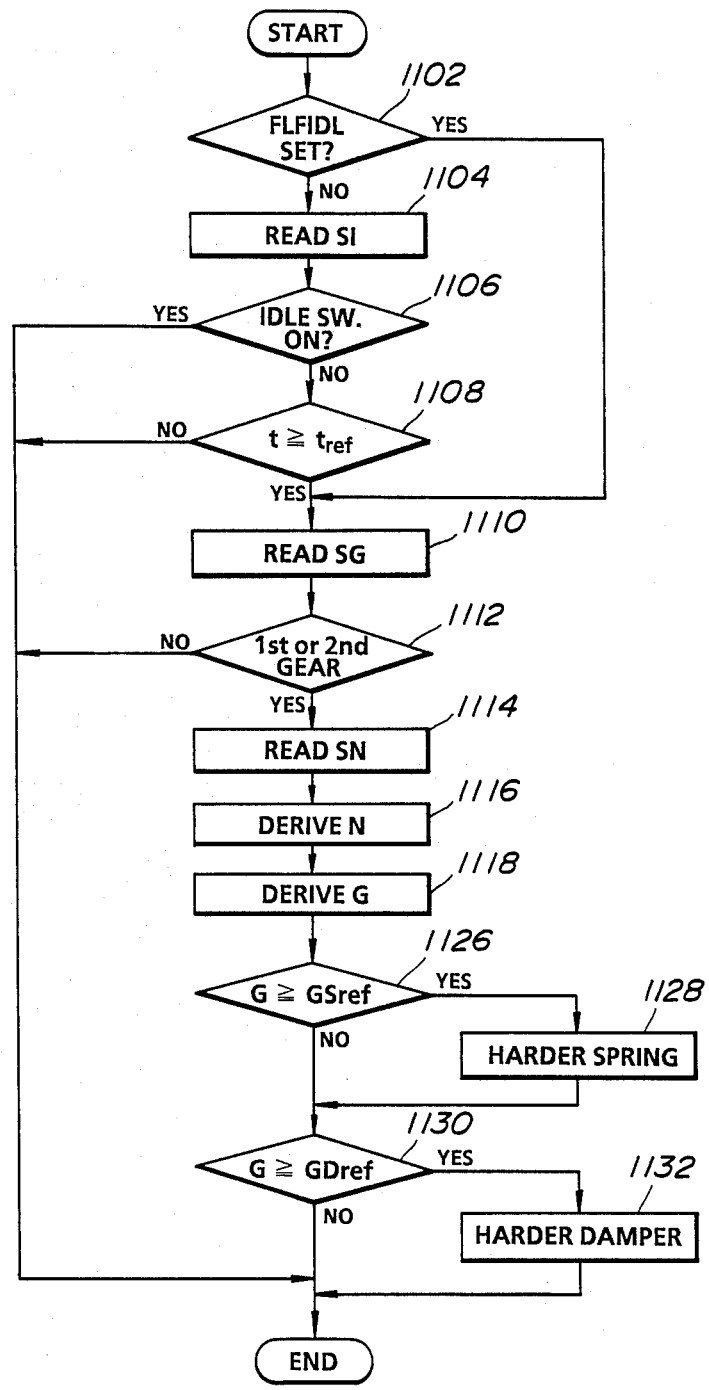
FIG. 8 is a flowchart of a routine for performing anti-squat suspension control during abrupt acceleration.
Figure 9:
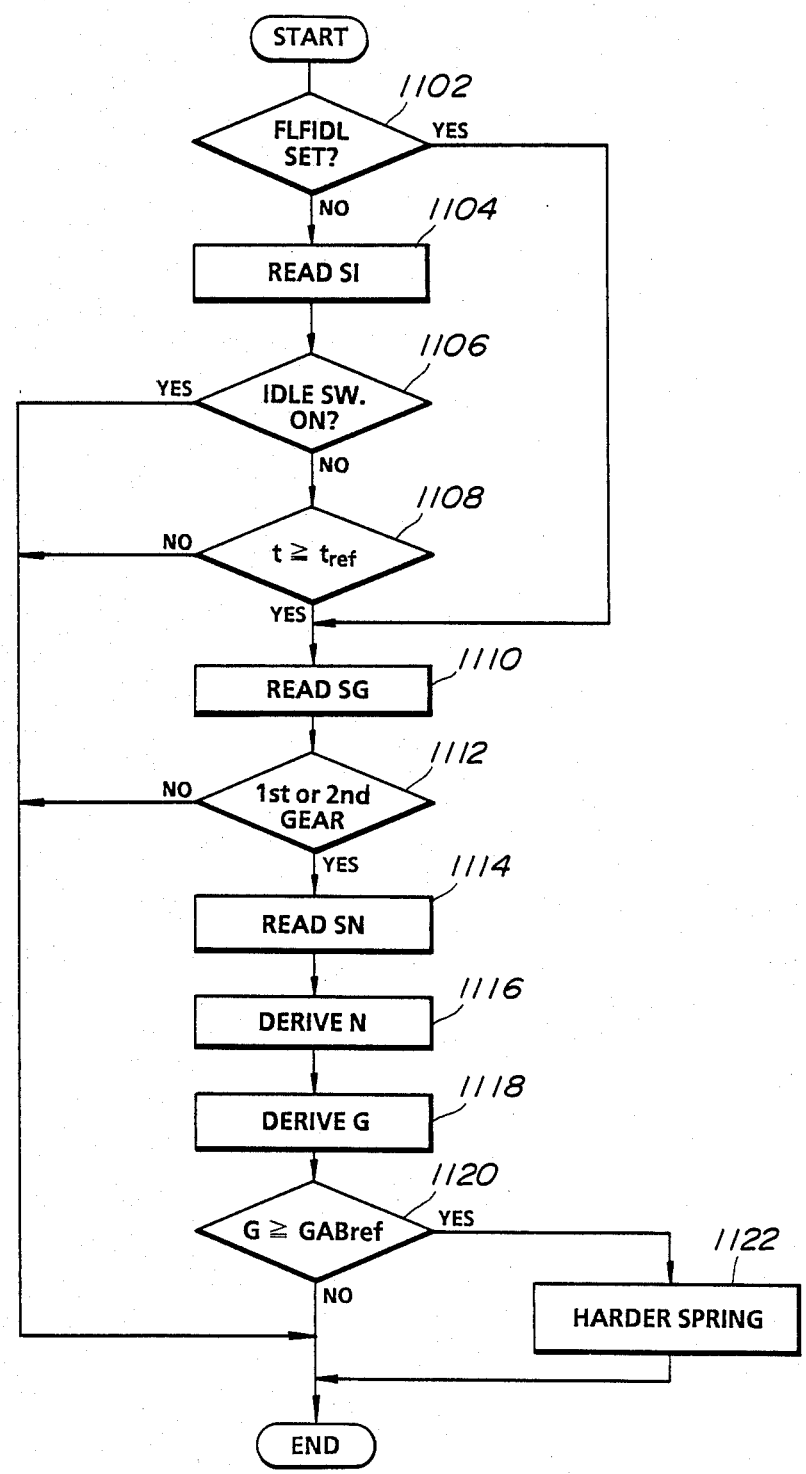
FIG. 9 is a flowchart of a routine for performing anti-squat suspension control during normal vehicle start-up.
Figure 10:
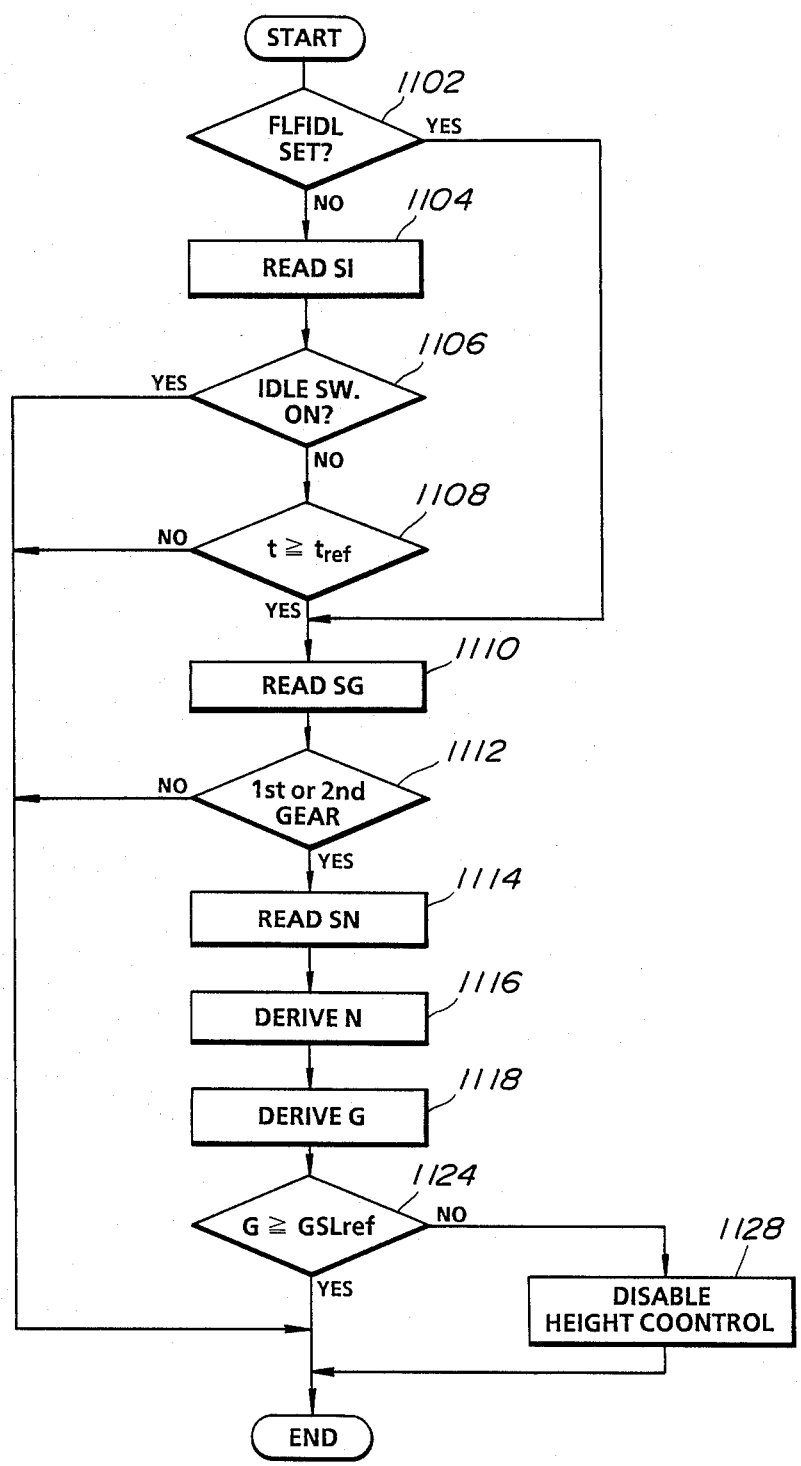
FIG. 10 is a flowchart of a routine for performing suspension control during slow start-up of the vehicle.

If desired, the routine shown in FIG. 7 can be established as a separate three routines. For instance, by discriminating abrupt acceleration state, normal acceleration state and slow acceleration state upon starting of running based on magnitude of acceleration demand which can be detected on the basis of variation of throttle valve angular position as monitored by a known throttle angle sensor. In this case, respective separated routines are established as illustrated in FIGS. 8, 9 and 10. In these routine, the operation to be performed in each step should be identical or essentially similar to that discussed with respect to the routine of FIG. 7. The steps performing same or similar processes are represented by the same step number and are neglected the redundant discussion.

As will be appreciated herefrom, the present invention can successfully perform anti-squat suspension control for suppressing squat upon vehicular acceleration. Furthermore, the invention can maintain the anti-squat control active even when the idle switch is in failure.

Therefore, the invention fulfills all of the objects and advantages sought therefor.

What is claimed is:

1. A suspension control system for an automotive vehicle comprising:
   a suspension assembly disposed between a vehicle body and a suspension member rotatably supporting a road wheel, said supension assembly including
   a shock absorber variable of damping characteristics at least between a first harder damping mode and a second softer damping mode in which is produced a damping force smaller than that produced in said first harder damping mode;
   a pneumatic spring variable of spring characteristics at least between a first stiffer spring mode and a second softer spring mode in which said pneumatic spring is softer than that in said first stiffer spring mode;
   a sensor means monitoring preselected suspension control parameters affecting vehicular attitude, said sensor means including a sensor for monitoring magnitude of vehicular acceleration representing parameter; and
   a control unit receiving inputs representative of said suspension control parameter including vehicular acceleration representing parameter from said sensor means to derive a damping control signal for operating said shock absorber to one of said first harder damper mode and said second softer damper mode, and a spring control signal for operating said pneumatic spring to one of said first stiffer spring mode and said second softer spring mode, said control unit normally operating said shock absorber to said second softer damping mode and said pneumatic spring to said second softer spring mode, said control unit being responsive to acceleration magnitude greater than a first acceleration threshold to operate said shock absorber to said first harder damper mode, and said control unit being responsive to acceleration magnitude greater than a second acceleration threshold to operate said pneumatic spring to said first stiffer spring mode.

2. A suspension control system as set forth in claim 1, wherein said control unit detects vehicle driving condition to cause squat based on said suspension control parameters for performing anti-squat control by selectively operating said shock absorber and said pneumatic spring to said first modes.

3. A suspension control system as set forth in claim 2, wherein said sensor means detects an engine idle switch position switching from ON to OFF to perform said anti-squat control with a given delay time from the timing of switching of said idle switch.

4. A suspension control system as set forth in claim 3, wherein said sensor means further monitors an engine speed representing parameter, and said controller detects faulty condition of said idle switch in view of an engine speed data derived from said engine speed representing parameter to disable providing of said given delay time in anti-squat control.

5. A suspension control system as set forth in claim 4, wherein said control unit detects ON position of said idle switch representing the engine idling state and compares said engine speed data with an engine speed reference value representative of a possible maximum engine idling speed, to detect faulty condition of said idle switch when said engine speed data is greater than said engine speed reference value.

6. A suspension control system as set forth in claim 5, wherein said control unit disables providing of said given delay time when said idle switch is held ON and said engine speed data is held greater than said engine speed reference over a given period of time.

7. An anti-squat suspension control system for an automotive vehicle comprising:
a front suspension assembly disposed between a vehicle body and a suspension member rotatably supporting a front road wheel, said front suspension assembly including
a first shock absorber variable of damping characteristics at least between a first harder damping mode and a second softer damping mode in which is produced a damping force smaller than that produce in said first harder damping mode;
a first pneumatic spring variable of spring characteristics at least between a first stiffer spring mode and a second soft spring mode in which said pneumatic spring is softer than that in said first stiffer spring mode;
a rear suspension assembly disposed between a vehicle body and a suspension member rotatably supporting a rear road wheel, said rear suspension assembly including
a second shock absorber variable of damping characteristics at least between a first harder damping mode and a second softer damping mode in which is produced a damping force smaller than that produced in said first harder damping mode;
a second pneumatic spring variable of spring characteristics at least between a first stiffer spring mode and a second softer spring mode in which said pneumatic spring is softer than that in said first stiffer spring mode;
a sensor means monitoring preselected suspension control parameters affecting vehicular attitude, said sensor means including a sensor for monitoring magnitude of vehicular acceleration representing parameter; and
a control unit receiving inputs representative of said suspension control parameter including vehicular acceleration representing parameter from said sensor means to detect the vehicle driving condition causing squat and derive a squat magnitude representing value, said control unit deriving a damping control signal for operating said shook absorber to one of said first harder damper mode and said second softer damper mode, and a spring control signal for operating said pnemuatic spring to one of said first stiffer spring mode and said second softer spring mode, on the basis of said suspension control parameters, said control unit normally operating said shock absorber to said second softer damping mode and said pneumatic spring to said second softer spring mode, said control unit being responsive to said squat magnitude representing value greater than a first threshold to operate said second shock absorber in said rear suspension assembly to said first harder damper mode, and said control unit being responsive to said squat magnitude representing value greater than a second threshold to operate said second pneumatic spring in said rear suspension assembly to said first stiffer spring mode.

8. An anti-squat suspension control system as set forth in claim 7, wherein said control unit provides a given delay time for operating one or both of said second shocker absorber and said second pneumatic spring to said first mode after squat magnitude indicative value greater than one or both of said first and second threshold.

9. A suspension control system as set forth in claim 7, wherein said control unit detects vehicle driving condition to cause squat based on said suspension control parameters for performing anti-squat control by selectively operating said shock absorber and said pneumatic spring to said first modes.

10. A suspension control system as set forth in claim 9, wherein said sensor means detects an engine idle switch position switching from ON to OFF to perform said anti-squat control with a given delay time from the timing of switching of said idle switch.

11. A suspension control ssytem as set forth in claim 10, wherein said sensor means further monitors an engine speed representing parameter, and said controller detects faulty condition of said idle switch in view of an engine speed data derived from said engine speed representing parameter to disable providing of said given delay time in anti-squat control.

12. A suspension control system as set forth in claim 11, wherein said control unit detects ON position of said idle switch representing the engine idling state and compares said engine speed data with an engine speed reference value representative of a possible maximum engine idling speed, to detect faulty condition of said idle switch when said engine speed data is greater than said engine speed reference value.

13. A suspension control system as set forth in claim 12, wherein said control unit disables providing of said given delay time when said idle switch is held ON and said engine speed data is held greater than said engine speed reference over a given period of time.

14. An anti-suat suspension control system for an automotive vehicle comprising:
a front suspension assembly disposed between a vehicle body and a suspension member rotatably supporting a front road wheel, said front suspension assembly including
a first shock absorber variable of damping characteristics at least between a first harder damping mode and a second softer damping mode in which is produced a damping force smaller than that prouced in said first harder damping mode;

a first pneumatic spring variable of spring characteristics at least between a first stiffer spring mode and a second softer spring mode
in which said pneumatic spring is softer than that in said first stiffer spring mode;
a rear suspension assembly disposed between a vehicle body and a suspension member rotatably supporting a rear road wheel, said rear suspension assembly including
  a second shock absorber variable of damping characteristics at least between a first harder damping mode and a second softer damping mode in which is produced a damping force smaller than that produced in said first harder damping mode;
  a second pneumatic spring variable of spring characteristics at least between a first stiffer spring mode and a second softer spring mode in which said pneumatic spring is softer than that in said first stiffer spring mode;
a sensor means monitoring preselected suspension control parameters affecting vehicular attitude, said sensor means including a sensor for monitoring magnitude of vehicular acceleration representing parameter, said sensor means detecting an engine idle switch position switching from ON to OFF and engine speed representing parameter;
a control unit receiving inputs representative of said suspension control parameter including vehicular acceleration representing parameter from said sensor means to detect the vehicle driving condition causing squat and derive a squat magnitude representing value, said control unit deriving a damping control signal for operating said shock absorber to one of said first harder damper mode and said second softer damper mode, and a spring control signal for operating said penumatic spring to one of said first stiffer spring mode and said second softer spring mode, on the basis of said suspension control parameters, said control unit normally operating said shock absorber to said second softer damping mode and said pneumatic spring to said second softer spring mode, said control unit being responsive to said squat magnitude representing value greater than a first threshold to operate said second shock absorber in said rear suspension assembly to said first harder damper mode, said control unit being responsive to said squat magnitude representing value greater than a second threshold to operate said second pneumatic spring in said rear suspension assembly to said first stiffer spring mode, said control unit being responsive to ON state of said idle switch and switching of said idle switch from ON to OFF for providing a given delay time to initiate said anti-squat control after the timing of switching of said idle switch, and said controller detecting faulty condition of said idle switch in view of an engine speed data derived from said engine speed representing parameter to disable providing of said given delay time in anti-squat control.

15. A suspension control system as set forth in claim 14, wherein said control unit detects ON position of said idle switch representing the engine idling state and compares said engine speed data with an engine speed reference value representative of a possible maximum engine idling speed, to detect faulty condition of said idle switch when said engine speed data is greater than said engine speed reference value.

16. A suspension control system as set forth in claim 15, wherein said control unit disables providing of said given delay time when said idle switch is held ON and said engine speed data is held greater than said engine speed reference over a given period of time.

17. An anti-squat suspension control system for an automotive vehicle comprising:
a front suspension assembly disposed between a vehicle body and a suspension member rotatably supporting a front road wheel, said front suspension assembly being variable of suspension characteristics at least between a first harder mode and a second softer mode;
a rear suspension assembly disposed between a vehicle body and a suspension member rotatably supporting a rear road wheel, said rear suspension assembly being variable of suspension characteristics at least between a first harder mode and a second softer mode;
a sensor means monitoring preselected suspension control parameters affecting vehicular attitude, said sensor means including a sensor for monitoring magnitude of vehicular acceleration representing parameter, said sensor means detecting an engine idle switch position switching from ON to OFF and engine speed representing parameter;
a control unit receiving inputs representative of said suspension control parameter including vehicular acceleration representing parameter from said sensor means to detect the vehicle driving condition causing squat and derive a squat magnitude representing value, said control unit deriving a damping control signal for operating said front and rear suspension members to one of said first harder mode and said second softer mode, said control unit normally operating said front and rear suspension systems to first softer mode, said control unit being responsive to said squat magnitude representing value greater than a predetermined threshold to operate said rear suspension system to said first harder mode and to maintain said front suspension system at said second softer mode, said control unit being responsive to ON state of said idle switch and switching of said idle switch from ON to OFF for providing a given delay time to initiate said anti-squat control after the timing of switching of said idle switch, and said controller detecting faulty condition of said idle switch in view of an engine speed data derived from said engine speed representing parameter to disable providing of said given delay time in anti-squat control.

* * * * *